US012785442B2

(12) United States Patent
Jinno et al.

(10) Patent No.: US 12,785,442 B2
(45) Date of Patent: Nov. 3, 2026

(54) CONTROL DEVICE, CONTROL METHOD, AND STORAGE MEDIUM

(71) Applicant: HONDA MOTOR CO., LTD., Tokyo (JP)

(72) Inventors: Tatsuya Jinno, Wako (JP); Yasuhiro Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/830,566

(22) Filed: Sep. 10, 2024

(65) Prior Publication Data

US 2024/0429741 A1 Dec. 26, 2024

Related U.S. Application Data

(63) Continuation of application No. PCT/JP2022/011725, filed on Mar. 15, 2022.

(51) Int. Cl.
*H02J 13/13* (2026.01)
*H02J 3/007* (2026.01)
(Continued)

(52) U.S. Cl.
CPC ............ *H02J 13/13* (2026.01); *H02J 3/0075* (2020.01); *H02J 3/381* (2013.01); *H02J 3/46* (2013.01);
(Continued)

(58) Field of Classification Search
CPC ..... Y02E 40/70; Y02B 70/3225; Y02B 70/30; Y02B 90/20; Y04S 20/222; Y04S 10/12;
(Continued)

(56) References Cited

U.S. PATENT DOCUMENTS

2015/0214737 A1* 7/2015 Ichino .................... G05B 15/02 700/297
2015/0309549 A1* 10/2015 Okabe .................. H02J 3/0073 713/330
(Continued)

FOREIGN PATENT DOCUMENTS

JP 2008-104284 A 5/2008
JP 2008-253002 A 10/2008
(Continued)

OTHER PUBLICATIONS

International Search Report for PCT/JP2022/011725 mailed Apr. 19, 2022 with partial English Translation.
IPRP for PCT/JP2022/011725 mailed Feb. 24, 2023.

*Primary Examiner* — Ryan Johnson
(74) *Attorney, Agent, or Firm* — Thomas Horstemeyer, LLP

(57) ABSTRACT

A control device acquires information regarding performance and running from each of a plurality of distributed power supplies; acquires a power demand amount from a plurality of demanders to which power is to be supplied by the plurality of distributed power supplies; acquires a selection criterion to be used at a time of selecting, from among the plurality of distributed power supplies, a distributed power supply to be operated when supplying power to the plurality of demanders. A control device selects a distributed power supply to be operated from among the plurality of distributed power supplies based on the information acquired, the power demand amount, and the selection criterion; creates an operation plan for the distributed power supply selected and controls running of the distributed power supply selected based on the operation plan created.

18 Claims, 9 Drawing Sheets

(51) Int. Cl.

| | |
|---|---|
| ***H02J 3/38*** | (2026.01) |
| ***H02J 3/46*** | (2026.01) |
| ***H02J 13/10*** | (2026.01) |
| ***H02J 13/12*** | (2026.01) |
| ***H02J 101/10*** | (2026.01) |
| ***H02J 101/24*** | (2026.01) |
| ***H02J 101/28*** | (2026.01) |
| ***H02J 101/30*** | (2026.01) |
| ***H02J 103/35*** | (2026.01) |

(52) U.S. Cl.
CPC .............. *H02J 13/10* (2026.01); *H02J 13/12* (2026.01); *H02J 2101/10* (2026.01); *H02J 2101/24* (2026.01); *H02J 2101/28* (2026.01); *H02J 2101/30* (2026.01); *H02J 2103/35* (2026.01); *Y02E 40/70* (2013.01)

(58) Field of Classification Search
CPC ....... Y04S 40/12; H02J 3/381; H02J 2300/10; H02J 13/00002; H02J 3/46; H02J 13/00006; H02J 13/00034; H02J 3/144; H02J 2203/10
See application file for complete search history.

(56) References Cited

U.S. PATENT DOCUMENTS

| | | | | |
|---|---|---|---|---|
| 2015/0318698 | A1* | 11/2015 | Tani .......................... | H02J 3/00<br>700/287 |
| 2017/0214273 | A1* | 7/2017 | Kogo ................ | H02J 13/00017 |
| 2020/0153254 | A1* | 5/2020 | Saito ......................... | H02J 3/32 |

FOREIGN PATENT DOCUMENTS

| | | | | |
|---|---|---|---|---|
| JP | 2009-261114 | A | | 11/2009 |
| JP | 2016025792 | A | * | 2/2016 |
| WO | 2012/124368 | A1 | | 9/2012 |
| WO | 2023/175745 | A1 | | 9/2023 |

* cited by examiner

FIG. 9A

| DEMANDER ID | POWER DEMAND AMOUNT |
|---|---|
| U001 | 18 kWh |
| U002 | 23 kWh |
| . . . . . . . . . | |
| TOTAL POWER DEMAND AMOUNT | AAAA kWh |

FIG. 9B

| DISTRIBUTED POWER SUPPLY ID | | | | | | |
|---|---|---|---|---|---|---|
| P01 | PERFORMANCE INFORMATION | | | | | |
| | POWER GENERATION TYPE | POWER GENERATION UNIT PRICE | GAS EMISSION AMOUNT | NOISE GENERATION AMOUNT | . . . . | |
| | SUNLIGHT | 8 JPY | 20g-CO2/kWh | 60 dB | | |
| | RUNNING INFORMATION | | | | | |
| | GRID CONNECTED STATE | OPERATION TIME | POWER GENERATION AMOUNT | POWER STORAGE AMOUNT | OPERATION STATE | . . . |
| | CONNECTION | 9:00-18:00 | 5 kWh | 7 kWh | NORMAL | |
| P02 | . . . | | | | | |
| . . . | | | | | | |

CONTROL DEVICE, CONTROL METHOD, AND STORAGE MEDIUM

CROSS-REFERENCE TO RELATED APPLICATION

This application is a continuation of International Patent Application No. PCT/JP2022/011725 filed on Mar. 15, 2022, the entire disclosures of which is incorporated herein by reference.

BACKGROUND OF THE INVENTION

Field of the Invention

The present invention relates to a control device, a control method, and a storage medium for supplying power to demanders using distributed power supplies.

Description of the Related Art

Japanese Patent Laid-Open No. 2008-253002 describes that a power relay device 1 can receive power specification information from power devices 40, freely connect the power devices 40 having different power specifications and the like to respective device connection units 10, and appropriately exchange power between the connected power devices 40.

SUMMARY OF THE INVENTION

In a case where there are a plurality of distributed power supplies that can be connected/disconnected to/from a power supply line as power supplies that supply power to demanders, a configuration is required in which distributed power supplies to be operated are flexibly selected from the plurality of distributed power supplies according to a selection criterion and the selected distributed power supplies are operated.

The present invention provides a control device, a control method, and a storage medium for flexibly selecting distributed power supplies to be operated from a plurality of distributed power supplies according to an operation criterion.

A control device according to the present invention is a control device capable of communicating with a plurality of distributed power supplies in a power supply system that supplies power to a demander, the control device comprising: a first acquisition unit configured to acquire information regarding performance and running from each of the plurality of distributed power supplies; a second acquisition unit configured to acquire a power demand amount from a plurality of demanders to which power is to be supplied by the plurality of distributed power supplies; a third acquisition unit configured to acquire a selection criterion to be used at a time of selecting, from among the plurality of distributed power supplies, a distributed power supply to be operated when supplying power to the plurality of demanders; a selection unit configured to select a distributed power supply to be operated from among the plurality of distributed power supplies based on the information acquired by the first acquisition unit, the power demand amount acquired by the second acquisition unit, and the selection criterion acquired by the third acquisition unit; a creation unit configured to create an operation plan for the distributed power supply selected by the selection unit; and a control unit configured to control running of the distributed power supply selected by the selection unit based on the operation plan created by the creation unit, wherein the selection unit acquires a combination of distributed power supplies operable with respect to the power demand amount acquired by the second acquisition unit based on the information acquired by the first acquisition unit, and in a case where a plurality of combinations are acquired, the selection unit determines priorities of the plurality of combinations based on the selection criterion acquired by the third acquisition unit, and selects distributed power supplies included in a combination having the highest priority.

A control method according to the present invention is a control method executed in a control device capable of communicating with a plurality of distributed power supplies in a power supply system that supplies power to a demander, the control method comprising: acquiring information regarding performance and running from each of the plurality of distributed power supplies; acquiring a power demand amount from a plurality of demanders to which power is to be supplied by the plurality of distributed power supplies; acquiring a selection criterion to be used at a time of selecting, from among the plurality of distributed power supplies, a distributed power supply to be operated when supplying power to the plurality of demanders; selecting a distributed power supply to be operated from among the plurality of distributed power supplies based on the acquired information, the acquired power demand amount, and the acquired selection criterion; creating an operation plan for the selected distributed power supply; and controlling running of the distributed power supply selected based on the created operation plan, wherein a combination of distributed power supplies operable with respect to the acquired power demand amount is acquired based on the acquired information, and in a case where a plurality of combinations are acquired, priorities of the plurality of combinations are determined based on the acquired selection criterion, and distributed power supplies included in a combination having the highest priority are selected.

A computer-readable storage medium according to the present invention is a computer-readable storage medium storing a program for causing a computer of a control device capable of communicating with a plurality of distributed power supplies in a power supply system that supplies power to a demander to function to: acquire information regarding performance and running from each of the plurality of distributed power supplies; acquire a power demand amount from a plurality of demanders to which power is to be supplied by the plurality of distributed power supplies; acquire a selection criterion to be used at a time of selecting, from among the plurality of distributed power supplies, a distributed power supply to be operated when supplying power to the plurality of demanders; select a distributed power supply to be operated from among the plurality of distributed power supplies based on the acquired information, the acquired power demand amount, and the acquired selection criterion; create an operation plan for the selected distributed power supply; and control running of the distributed power supply selected based on the created operation plan, wherein a combination of distributed power supplies operable with respect to the acquired power demand amount is acquired based on the acquired information, and in a case where a plurality of combinations are acquired, priorities of the plurality of combinations are determined based on the acquired selection criterion, and distributed power supplies included in a combination having the highest priority are selected.

According to the present invention, it is possible to flexibly select distributed power supplies to be operated from a plurality of distributed power supplies according to an operation criterion.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 9A is a diagram illustrating a database; and

FIG. 9B is a diagram illustrating a database.

DESCRIPTION OF THE EMBODIMENTS

Figure 1:
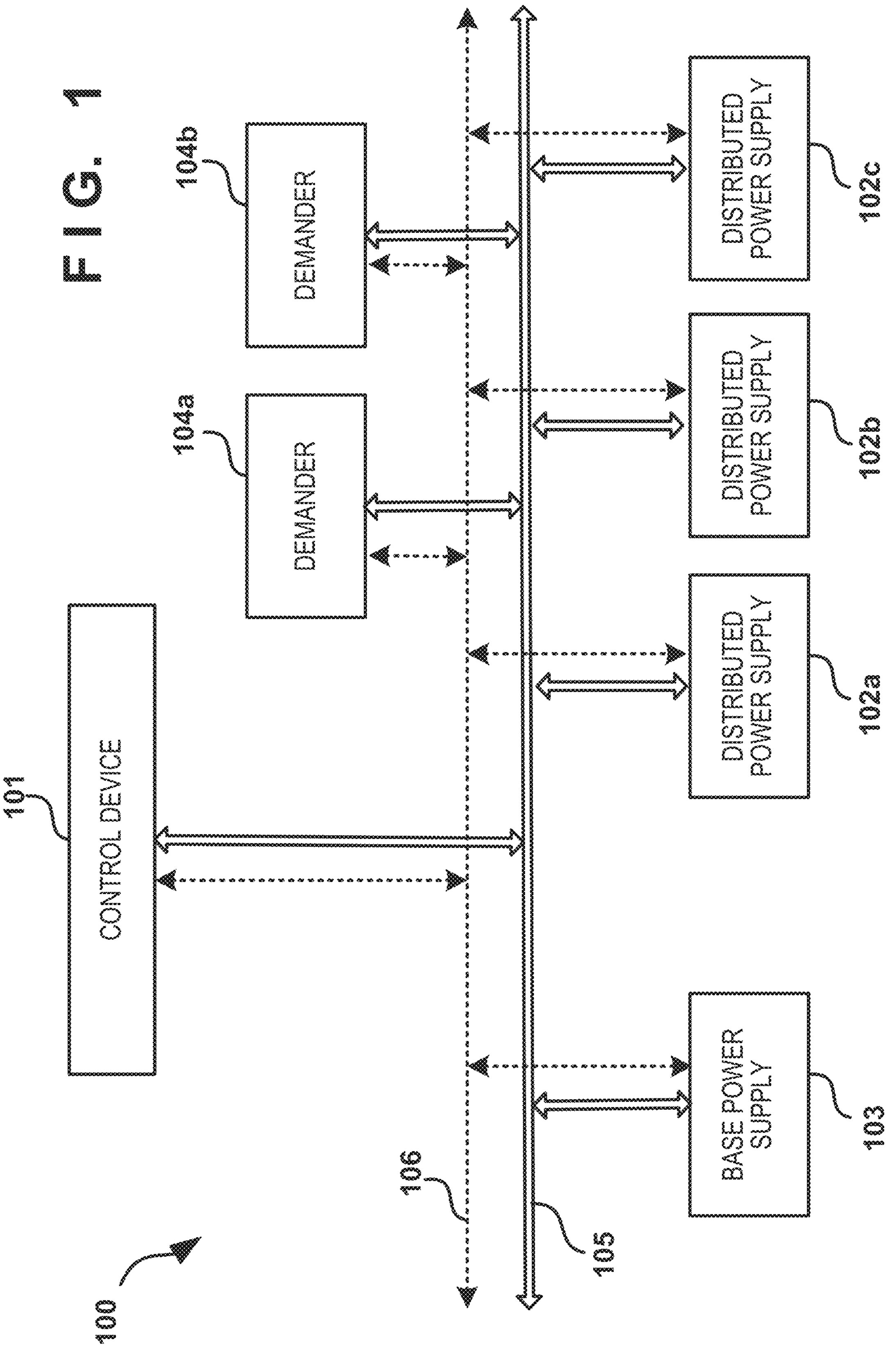
FIG. 1 is a diagram illustrating an overall configuration of a power control system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a diagram illustrating an overall configuration of a power supply system 100 that supplies power to demanders according to the present embodiment. As illustrated in FIG. 1, the power supply system 100 according to the present embodiment includes a control device 101, distributed power supplies 102*a*, 102*b*, and 102*c*, a base power supply 103, and demanders 104*a* and 104*b*. The demanders 104*a* and 104*b* refer to facilities themselves such as homes, factories, and buildings, and are supplied with power from the power supplies included in the power supply system 100. If the demanders 104*a* and 104*b* are home facilities, a system (home energy management system (HEMS)) for managing electric energy used in homes may be provided. In addition, if the demanders 104*a* and 104*b* are commercial facilities, a system (building energy management system (BEMS)) for managing electric energy used in the facilities may be provided. Although two demanders are exemplified in FIG. 1, the number of demanders is not limited to two. Hereinafter, the demanders 104*a* and 104*b* will be collectively referred to as demanders 104 unless they need to be distinguished from each other.

The distributed power supplies 102*a*, 102*b*, and 102*c* are operated when supplying power to the demanders 104. Unlike stationary power generation devices, the distributed power supplies 102*a*, 102*b*, and 102*c* are movable (portable) power generation devices. Although three distributed power supplies are exemplified in FIG. 1, the number of distributed power supplies is not limited to three. Hereinafter, the distributed power supplies 102*a*, 102*b*, and 102*c* will be collectively referred to as distributed power supplies 102 unless they need to be distinguished from each other. The distributed power supplies 102 include various types of power generation devices, e.g., diesel engine-based power generation devices, sunlight-based power generation devices, wind-based power generation devices, and fuel cell-based power generation devices. Although the power supply system 100 includes a plurality of distributed power supplies, all of them are not used to supply power to the demanders 104. In addition, while power is supplied to the demanders 104 via a power supply network 105, the distributed power supplies can be appropriately connected/disconnected to/from the power supply network 105 because they are portable. That is, the distributed power supplies to be operated may change depending on the timing of power supply to the demanders 104. The base power supply 103 is a stationary power generation device run at a relatively low cost. Similarly to the distributed power supplies 102, the base power supply 103 is used to supply power to the demanders 104, and may include the above-described various types of power generation devices.

In the present embodiment, it is assumed that the area where the power supply system 100 is constructed is an area that is not connected to a bulk power system from an electric utility, such as a remote island. That is, the distributed power supplies 102 and the base power supply 103 are used as power supply sources for the demanders 104. In the present embodiment, the base power supply 103 is not essential and may not be provided. That is, only the distributed power supplies 102 may be used as power supply sources for the demanders 104. In addition, although the description will be given on the premise that the area where the power supply system 100 is constructed is not connected to a bulk power system from an electric utility such as a retail electric utility or a power transmission/distribution utility, the area where the power supply system 100 is constructed may be connected to the bulk power system. In this case, the base power supply 103 may or may not be provided.

The control device 101 is a device that controls the distributed power supplies 102 to appropriately supply power with respect to power demand amounts of the demanders 104. As will be described below, the control device 101 selects distributed power supplies 102 to be operated according to the purpose of the power supply control input from an administrator of the control device 101. The power supply network 105 is a power supply network for each power supply source to supply power to the demander 104. The distributed power supply 102 is either connected or disconnected to or from the power supply network 105. In the present embodiment, the control device 101 can control the distributed power supply 102 to be either connected to the power supply network 105 or disconnected from the power supply network 105. A communication network 106 is a communication network for enabling communication between the devices in FIG. 1. The communication network 106 may be either in a wired type or in a wireless type. Alternatively, the communication network 106 may be in a combination of the wired type and the wireless type.

Figure 2:
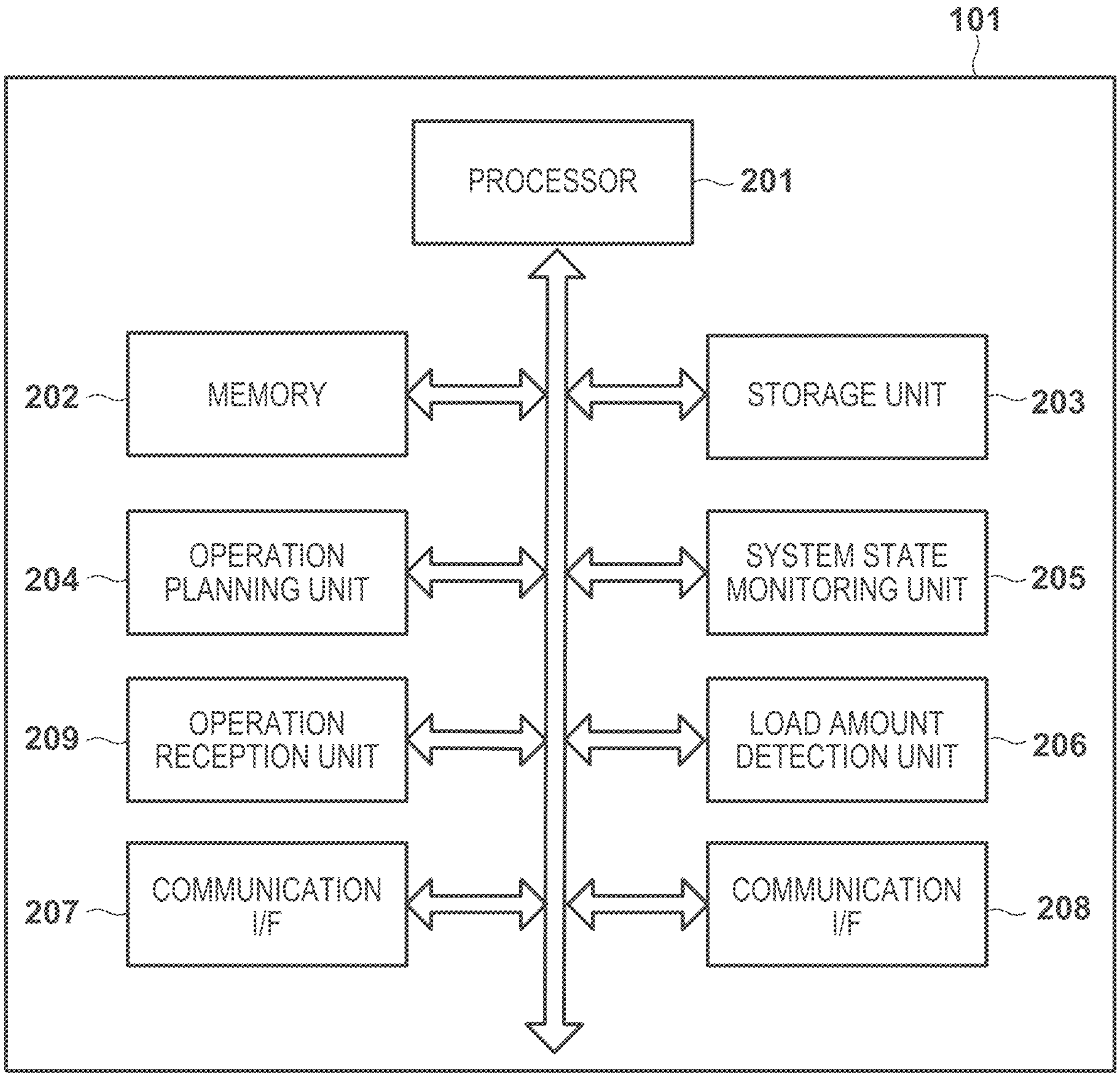
FIG. 2 is a block diagram illustrating a configuration of a control device.

FIG. 2 is a block diagram illustrating an example of a configuration of the control device 101. The configuration of FIG. 2 can be a computer capable of executing an invention related to a program stored in a computer-readable storage medium. The blocks illustrated in FIG. 2 are connected to each other via a system bus so as to be able to communicate. A processor 201, for example, reads a program stored in a storage unit 203 into a memory 202 and executes the program to generally control the control device 101, for example, so that the operation of the control device 101 according to the present embodiment is realized. The storage unit 203 stores, in addition to basic programs, data, and the like for operating the control device 101, programs, data, and the like for controlling a connected/disconnected state of the distributed power supply 102 with respect to the power supply network 105, and controlling a power storage operation/power generation operation of the distributed power supply 102. In addition, the storage unit 203 has a database that stores information regarding each of the demanders 104 and the distributed power supplies 102.

An operation planning unit 204 plans the operation of each distributed power supply 102 included in the power supply system 100 based on the purpose of the power supply control input from the administrator. The operation plan will be described below. The system state monitoring unit 205 periodically acquires information from each distributed power supply 102 included in the power control system 100. As will be described below, the acquired information includes performance information and running information for each distributed power supply 102. A load amount detection unit 206 periodically acquires information from the demanders 104 included in the power control system 100. As will be described below, the acquired information includes a power demand amount (a power load amount) for each demander 104. A communication interface (I/F) 207 is an interface for enabling communication with the demanders 104, and has a configuration corresponding to a medium of the communication network 106. A communication I/F 208 is an interface for enabling communication with the distributed power supplies 102, and has a configuration corresponding to a medium of the communication network 106.

An operation reception unit 209 includes, for example, a keyboard or a pointing device capable of receiving a demander operation. In addition, the operation reception unit 209 includes a display unit such as a display or a touch panel. Various user interface screens can be displayed on the display unit, and for example, a screen for the demander to input information regarding the purpose of the power supply control is displayed. Note that the demander is, for example, an administrator of the power supply system 100.

The control device 101 is not limited to the configuration illustrated in FIG. 2, and appropriately includes functional blocks that can be executed by a general-purpose information processing device. In addition, although not illustrated, a power supply interface for supplying power from the power supply network 105 is provided.

Figure 3:
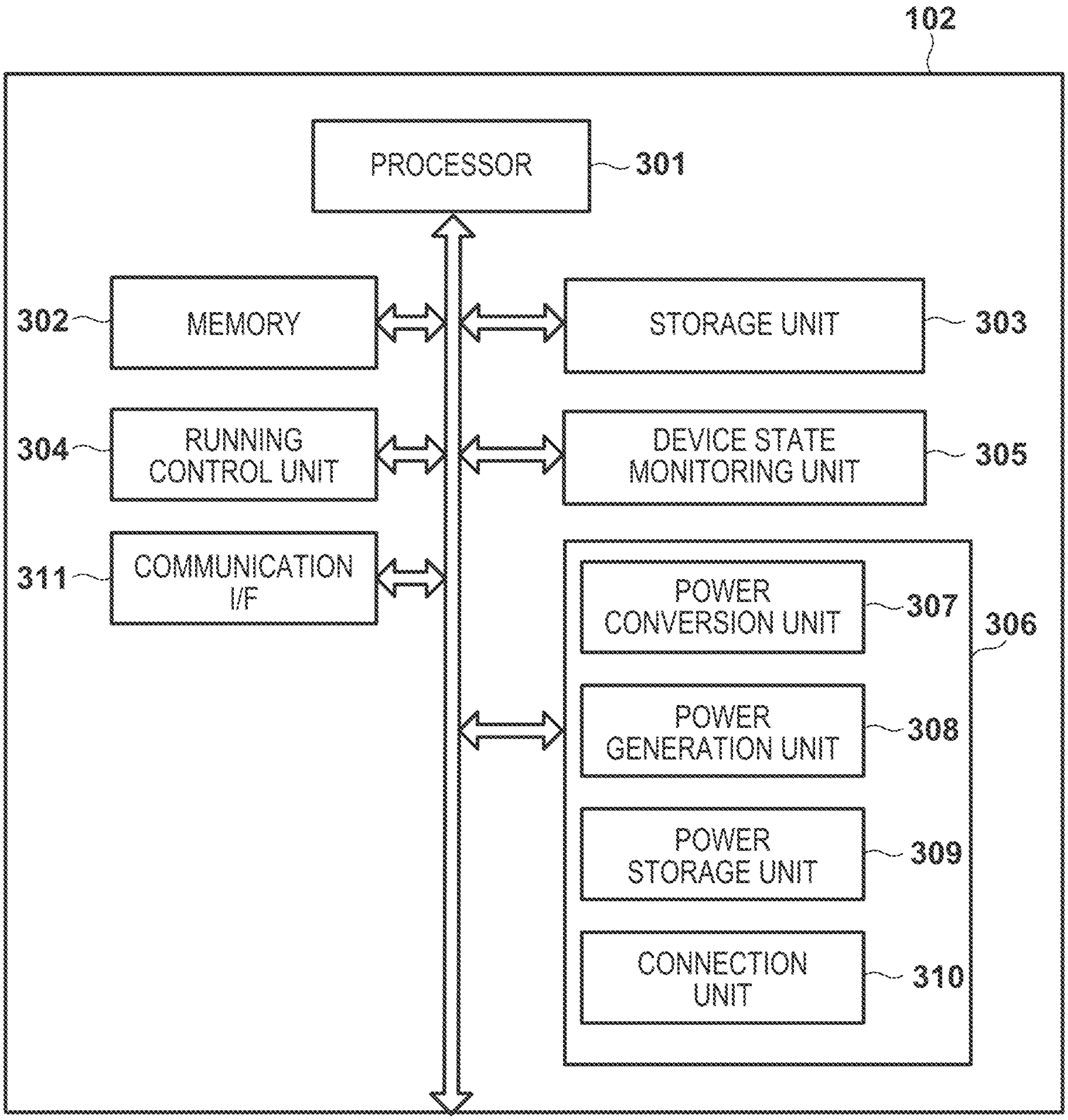
FIG. 3 is a block diagram illustrating a configuration of a distributed power supply.

FIG. 3 is a block diagram illustrating an example of a configuration of the distributed power supply 102. The configuration of FIG. 3 can be a computer capable of executing an invention related to a program stored in a computer-readable storage medium. The blocks illustrated in FIG. 3 are connected to each other via a system bus so as to be able to communicate. A processor 301, for example, reads a program stored in a storage unit 303 into a memory 302 and executes the program to generally control the distributed power supply 102, for example, so that the operation of the distributed power supply 102 according to the present embodiment is realized.

A running control unit 304 controls a power storage operation, a power generation operation, and a connection/disconnection operation with respect to the power supply network 105 of the distributed power supply 102. In the present embodiment, the running control unit 304 controls the above-described operation based on an instruction from the control device 101. The device state monitoring unit 305 monitors a state of the distributed power supply 102 based on a signal from a sensor (not illustrated) provided in each unit of the distributed power supply 102. The sensor includes, for example, a sensor that detects a connected state of the distributed power supply 102 with respect to the power supply network 105 (e.g., an opened/closed state of a switch), and a sensor that detects a remaining amount of energy stored in a power storage unit 309.

A power feeding unit 306 is a block for feeding power generated by a power generation unit 308 to the power supply network 105. The power generation unit 308 has a power generation configuration according to the power generation method of the distributed power supply 102. A power conversion unit 307 includes an inverter that performs DC-AC conversion, and performs power conversion so that power can be supplied to the power supply network 105. The power storage unit 309 includes a storage battery, and can store some of the power generated by the power generation unit 308. A connection unit 310 includes a switch that switches between connection and disconnection with respect to the power supply network 105. A communication I/F 311 is an interface for enabling communication with the control device 101, and has a configuration corresponding to a medium of the communication network 106.

The distributed power supply 102 is not limited to the configuration illustrated in FIG. 3, and appropriately includes functional blocks that can be executed by a distributed power supply adopting each power generation method.

Figure 4:
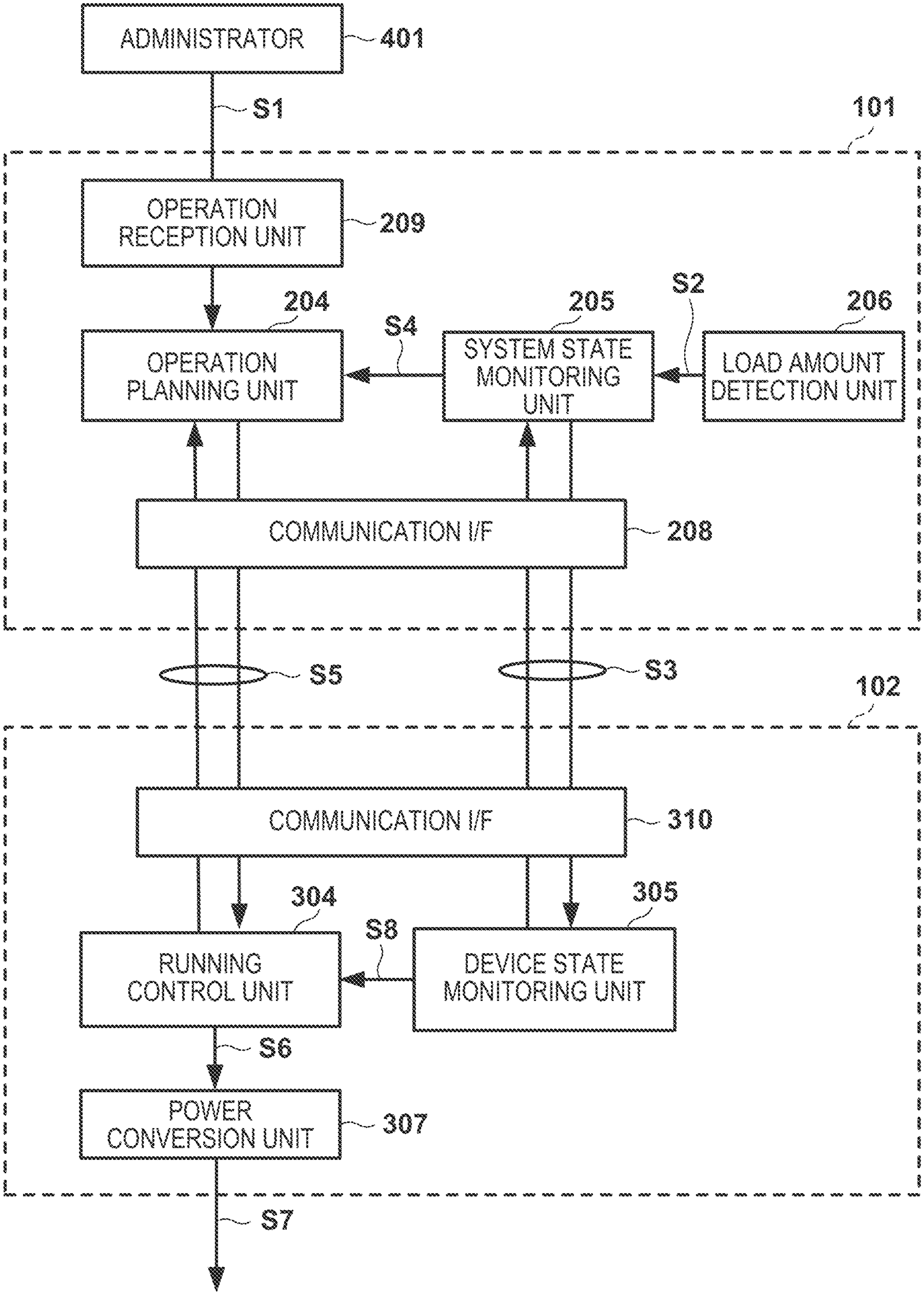
FIG. 4 is a diagram illustrating a flow of a process between the control device and the distributed power supply.

FIG. 4 is a diagram illustrating a flow of a process between the control device 101 and the distributed power supply 102.

In S1, the operation planning unit 204 receives information on the purpose of the power supply control from an administrator 401. The reception of the information may be performed by, for example, an input on an interface screen displayed on the display unit, or may be performed by receiving information stored in another terminal via the communication network 106.

In S2, the load amount detection unit 206 periodically acquires a total power demand amount in an area managed by the control device 101 or the administrator 401, and transmits the acquired total power demand amount to the system state monitoring unit 205. In S3, the system state monitoring unit 205 periodically acquires performance information and running information from the distributed power supply 102. Through the processing in S2 and S3, the system state monitoring unit 205 constantly acquires a total power demand amount in the managed area, and performance information and running information for each distributed power supply 102 existing in the area.

Figure 5A:
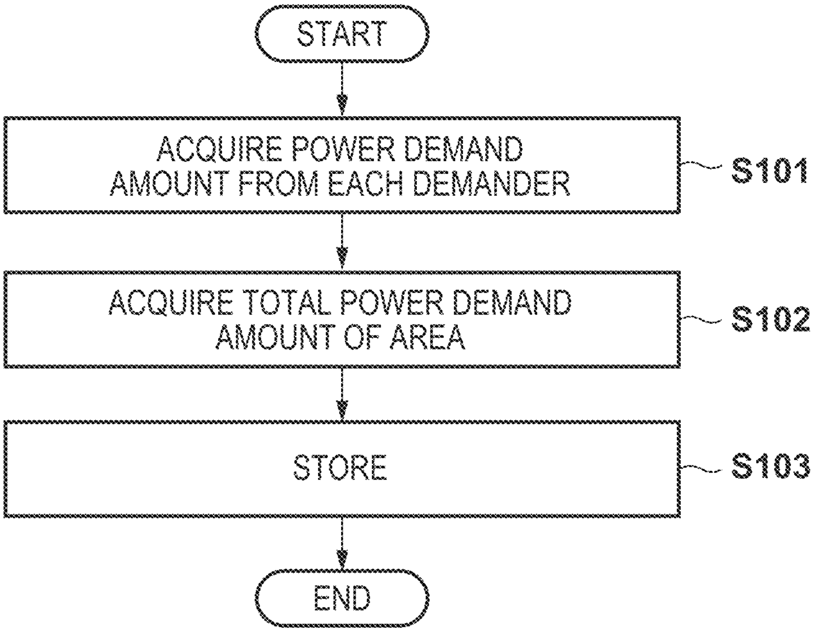
FIG. 5A is a flowchart illustrating a process executed in the control device.

FIG. 5A is a flowchart illustrating a process of acquiring a power demand amount executed in the load amount detection unit 206. The process of FIG. 5A is realized, for example, by the processor 201 reading a program stored in the storage unit 203 into the memory 202 and executing the program. The process of FIG. 5A is repeatedly executed at predetermined time intervals.

In S101, the load amount detection unit 206 acquires a power demand amount from each demander 104. As described above, the demander 104 has, for example, an electric energy management system such as an HEMS or a BEMS. In that case, for example, the load amount detection unit 206 acquires a total power demand amount of the demander 104 in a predetermined period such as a month from an energy management system (EMS) control unit that controls an operation of a power device installed in the demander 104. In S102, the load amount detection unit 206 adds up the power demand amounts acquired from the respective demanders 104 in the area managed by the control device 101. In S103, the load amount detection unit 206 stores the power demand amount acquired in S101 and the total power demand amount acquired in S102 in a database included in the storage unit 203. After S103, the process of FIG. 5A ends.

FIG. 9A is a diagram illustrating an example of a database for a power demand amount of each demander 104 stored in the storage unit 203. As illustrated in FIG. 9A, the power demand amount is stored in association with identification information for each demander 104. In addition, a total value (a total power demand amount) of the power demand amounts of the respective demanders 104 in a predetermined period is also stored. In other words, a total power demand amount of an area in a predetermined period is managed. The database of FIG. 9A is updated every time the process of FIG. 5A is executed.

Figure 5B:
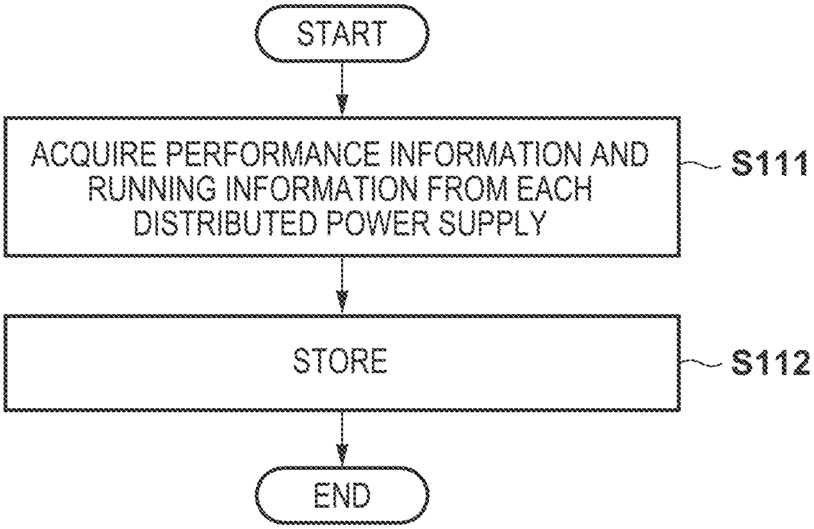
FIG. 5B is a flowchart illustrating a process executed in the control device.

FIG. 5B is a flowchart illustrating a process of acquiring performance information and running information for the distributed power supply 102 executed in the system state monitoring unit 205. The process of FIG. 5B is realized, for example, by the processor 201 reading a program stored in the storage unit 203 into the memory 202 and executing the program. The process of FIG. 5B is repeatedly executed at predetermined time intervals.

In S111, the system state monitoring unit 205 acquires performance information and running information from each distributed power supply 102. In S112, the system state monitoring unit 205 stores the performance information and the running information acquired in S111 in association with the distributed power supply 102 in a database included in the storage unit 203. After S112, the process of FIG. 5B ends.

FIG. 9B is a diagram illustrating an example of a database for performance information and running information for each distributed power supply 102 stored in the storage unit 203. The performance information is information indicating a performance of the distributed power supply 102, and includes, for example, information regarding a power generation method and information regarding a load on a surrounding environment while the distributed power supply 102 is running. The performance information includes, for example, information regarding a power generation method, a power generation unit price, a gas emission amount, and a noise generation amount. The running information is information indicating a running state of the distributed power supply 102, and includes, for example, a connection state (connected/disconnected) with respect to the power supply network 105, an operation time, a power generation amount, a power storage amount (a remaining energy amount) of the power storage unit 309, and an operation state (normal or abnormal). The system state monitoring unit 205 may acquire the above-described information by acquiring specification information stored in advance in the storage unit 303 of the distributed power supply 102. The device state monitoring unit 305 of the distributed power supply 102 appropriately collects running information using a sensor or the like provided in each unit. The system state monitoring unit 205 may acquire the running information by transmitting an information acquisition request to the device state monitoring unit 305. The database of FIG. 9B is updated every time the process of FIG. 5B is executed.

FIG. 4 will be referred to again. In S4, the system state monitoring unit 205 transmits the total power demand amount of the area and the performance information and the running information for each distributed power supply 102 acquired in S2 and S3 to the operation planning unit 204. The system state monitoring unit 205 acquires information from the load amount detection unit 206 and the device state monitoring unit 305 at a predetermined timing. That is, the information is acquired in such a manner that there is no significant difference between the timing at which the total power demand amount is acquired and the timing at which the performance information and the running information are acquired.

The operation planning unit 204 selects a distributed power supply 102 to be operated from among the distributed power supplies 102 existing in the area based on the total power demand amount acquired from the system state monitoring unit 205, the performance information and the running information for each distributed power supply 102, and the information on the purpose of the power supply control input in S1. The operation planning unit 204 creates an operation plan for the selected distributed power supply 102, and transmits a running start instruction, a power generation instruction, a power storage instruction, and a running stop instruction to the running control unit 304 based on the operation plan in S5. Upon receiving the running-related instruction from the operation planning unit 204, the running control unit 304 controls each of a running start operation, a power generation operation, a power storage operation, and a running stop operation of the power conversion unit 307 according to the received instruction in S6. In S7, power is supplied from the power conversion unit 307 to the power supply network 105. On the other hand, in S8, when detecting an abnormality such as an error in the distributed power supply 102, the device state monitoring unit 305 notifies the running control unit 304 of the abnormality. The running control unit 304 transmits notification information indicating the occurrence of the abnormality to the operation planning unit 204.

In FIG. 4, the flow of the process has been explained using step numbers, but the time sequence is not limited to S1 to S8, and the order may be reversed between some of the steps. In addition, some of the steps may be performed in parallel.

Figure 6:
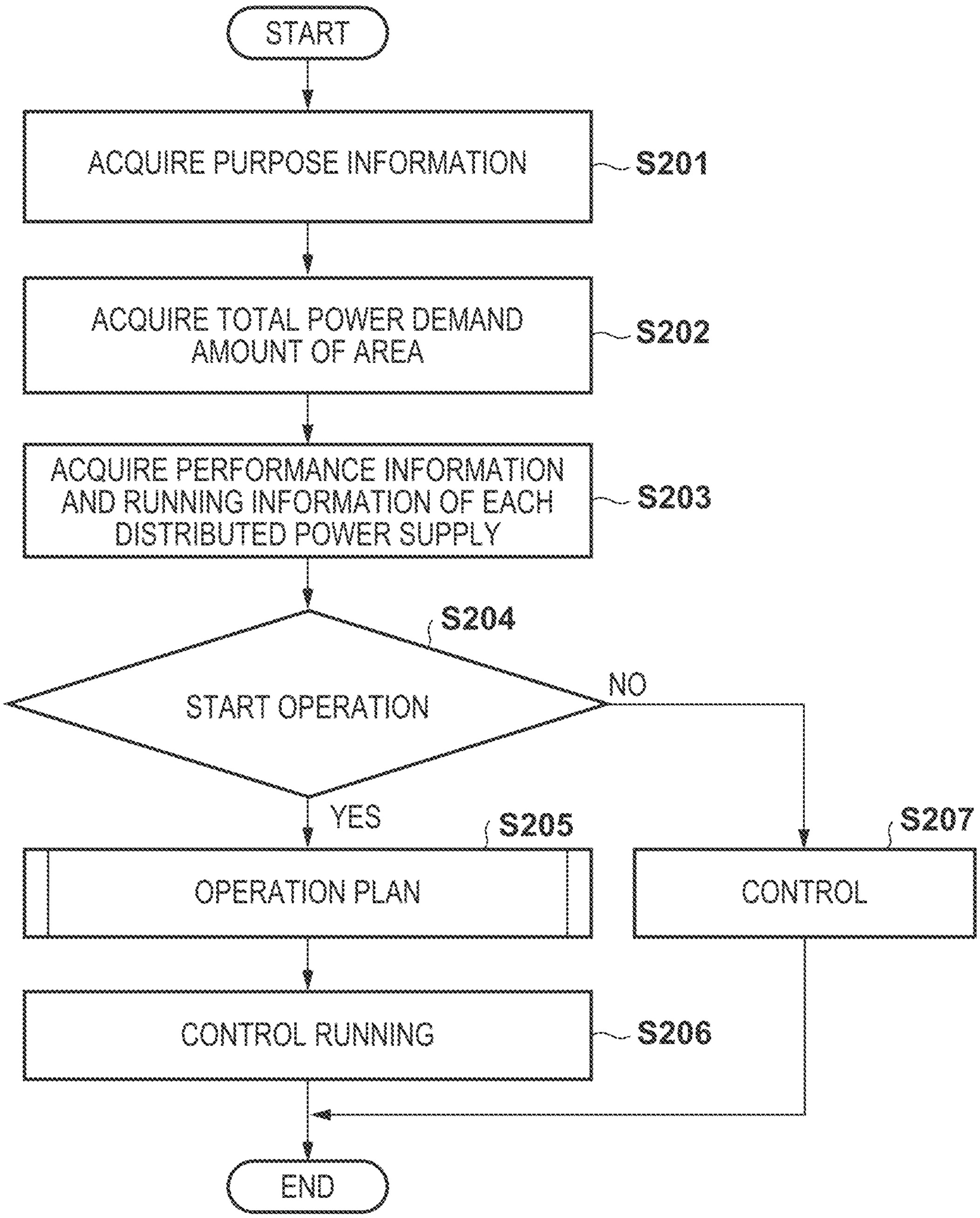
FIG. 6 is a flowchart illustrating a process executed in an operation planning unit.

FIG. 6 is a flowchart illustrating a process executed in the operation planning unit 204. The process of FIG. 6 is realized, for example, by the processor 201 reading a program stored in the storage unit 203 into the memory 202 and executing the program. The process of FIG. 6 is started, for example, by receiving an operation start instruction from the administrator 401. The operation start instruction may be received via, for example, a user interface screen displayed on the display unit of the control device 101.

In S201, the operation planning unit 204 acquires the information on the purpose of the power supply control input from the administrator 401. This processing corresponds to S1 in FIG. 4. In S202, the operation planning unit 204 acquires the total power demand amount of the area from the system state monitoring unit 205. This processing corresponds to S4 in FIG. 4. Note that the operation planning unit 204 may acquire the power demand amount for each demander 104 and calculate a total power demand amount of the area. In S203, the operation planning unit 204 acquires the performance information and the running information for each distributed power supply 102 from the system state monitoring unit 205. This processing corresponds to S4 in FIG. 4.

In S204, the operation planning unit 204 compares the total power demand amount of the area with a total power supply amount of the distributed power supplies existing in the area, and determines whether to start the operation of the distributed power supply 102. Here, the total power demand amount of the area is the total power demand amount acquired in S202. The operation planning unit 204 adds up power generation amounts included in the running information for the respective distributed power supplies 102 acquired in S203, and uses the total value as the total power supply amount. In other words, in S204, the total power demand amount of the area is compared with the power supply amount available when all the distributed power supplies existing in the area are running. In the present embodiment, the comparison is performed as follows.

First, the operation planning unit 204 calculates a total power demand amount for determination obtained by virtually increasing the total power demand amount. For example, the total power demand amount for determination is calculated by the following Formula (1).

$$\text{Total power demand amount for determination} = \text{total power demand amount acquired in } S202 \times \alpha \quad (1)$$

In Formula (1), α is a coefficient for increasing the total power demand amount for determination, and a value larger than or equal to 1, for example, 1.2, is used for the coefficient. The coefficient is a predetermined value, and may be settable by the administrator 401.

Then, in S204, it is determined whether the following Formula (2) is satisfied.

$$\text{Total power demand amount for determination} \leq \text{total power supply amount} \quad (2)$$

That is, in S204, it is determined whether the total power supply amount of the distributed power supplies 102 existing in the area exceeds the virtually increased total power demand amount for determination. Here, when the condition of Formula (2) is satisfied, this indicates that the total power supply amount of the distributed power supplies 102 has a sufficient margin with respect to the total power demand amount acquired in S202, and it is determined that the operation can be started. On the other hand, when the condition of Formula (2) is not satisfied, it is assumed that the total power demand amount acquired in S202 and the total power supply amount are similar, and it is determined not to start the operation because, if the operation is started, there is a risk of a power failure when some of the distributed power supplies 102 are disconnected from the power supply network 105.

When it is determined to start the operation in S204, the operation planning unit 204 creates an operation plan for each distributed power supply 102 in S205. The operation plan will be described below. After S205, in S206, the operation planning unit 204 controls the running of a distributed power supply 102 to be operated based on a timing planned in the operation plan created in S205. The control of the running is performed, for example, according to a running schedule in which the running of a distributed power supply 102 in solar power generation type is started at 10:00 on November 20 and the running of the distributed power supply 102 is stopped at 17:00 on November 20.

On the other hand, when it is determined not to start the operation in S204, the operation planning unit 204 controls each distributed power supply 102 so as to prohibit disconnection of each distributed power supply 102 from the power supply network 105. As a result, it is possible to prevent a risk of a power failure that may occur because the total power demand amount acquired in S202 and the total power supply amount acquired in S203 are similar to each other.

Figure 7:
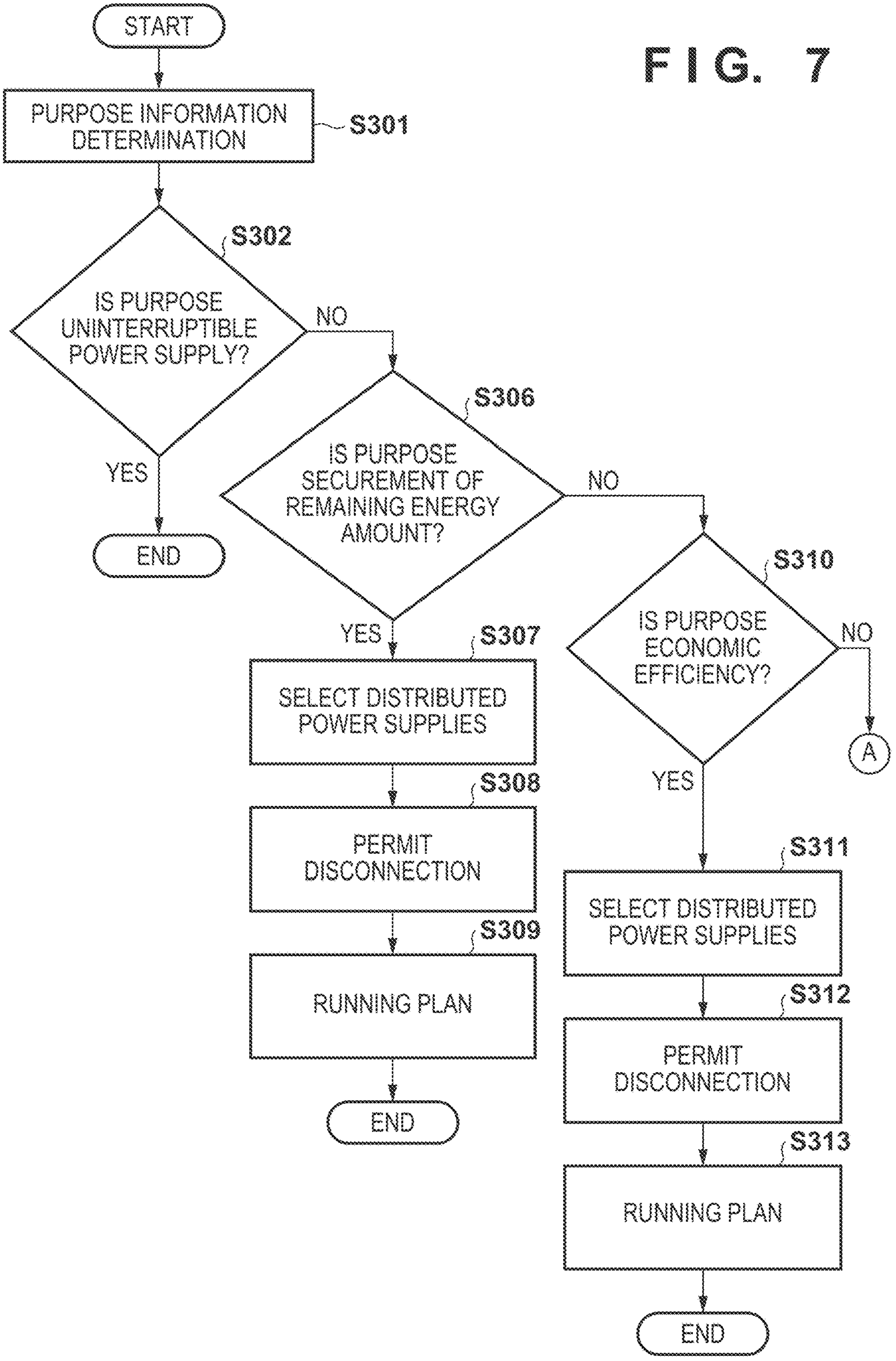
FIG. 7 is a flowchart illustrating processing of S205.
Figure 8:
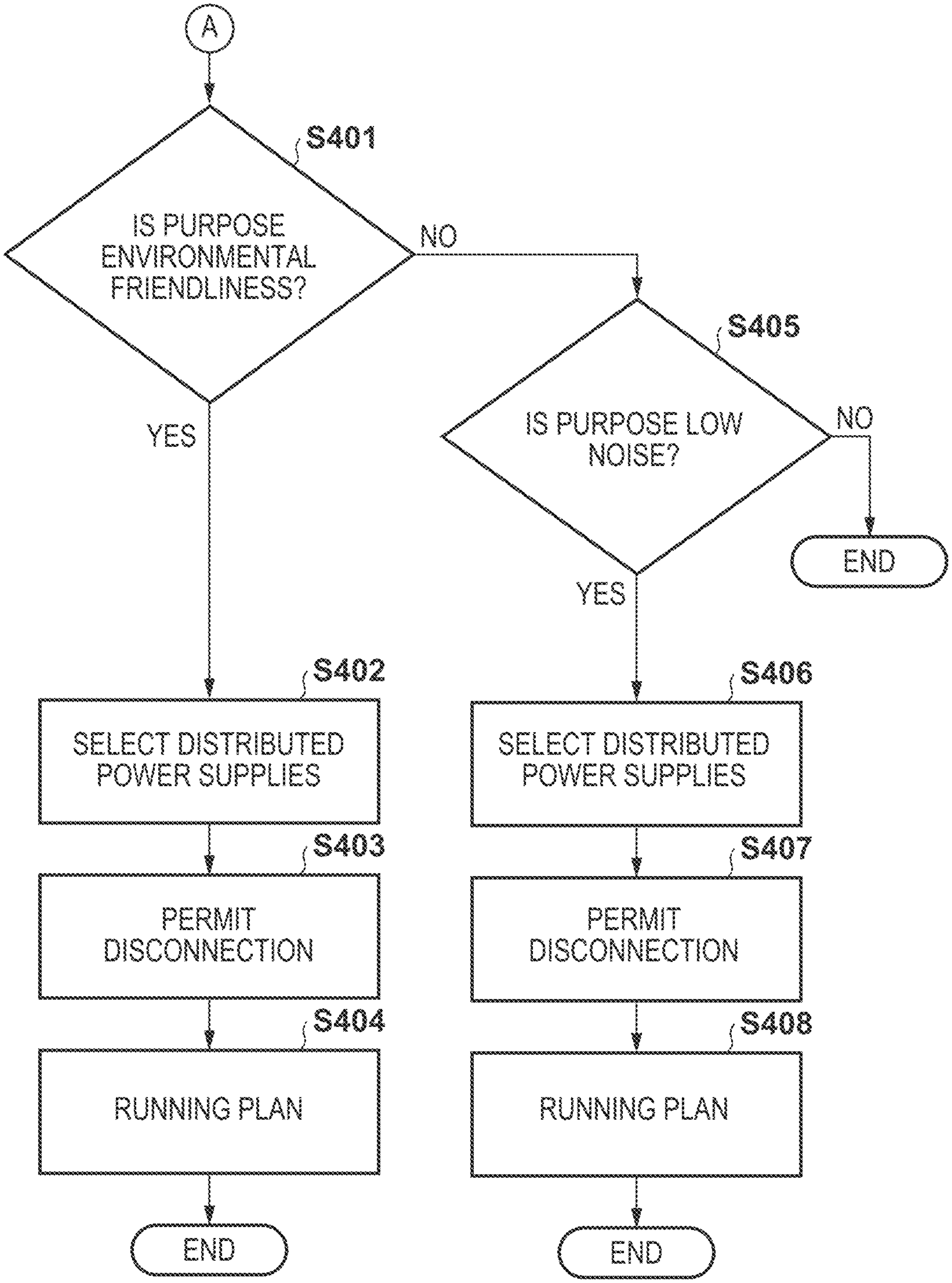
FIG. 8 is a flowchart illustrating processing of S205.

FIGS. 7 and 8 are flowcharts illustrating the processing of S205 in FIG. 6. In S301, the operation planning unit 204 determines the information on the purpose of the power supply control acquired in S201. For example, the determination in S301 may be made based on a purpose option selected on a user interface screen displayed on the display unit of the control device 101. For example, a plurality of selection options may be displayed on the user interface screen together with a message such as "Please select the purpose of operating the distributed power supply.". In the present embodiment, the following selection options can be selected by the administrator.

Uninterruptible power supply
Securement of remaining energy amount
Economic efficiency
Environmental friendliness
Low noise In S302, the operation planning unit 204 determines whether "uninterruptible power supply" is selected as the purpose option. The "uninterruptible power supply" may be selected in a case where the base power supply 103 is included in the power supply system 100 of FIG. 1. When it is determined that "uninterruptible power supply" is selected, the process of FIG. 7 ends, and the process proceeds to S206 of FIG. 6. Then, in S206, the operation planning unit 204 controls the running of each distributed power supply 102 so as to stabilize the power supply by the base power supply 103. For example, when the power supply of the base power supply 103 decreases, the operation planning unit 204 performs a control to select a distributed power supply 102 capable of compensating for the decreased power such that the operation of the selected distributed power supply 102 is started. In addition, when the power supply of the base power supply 103 is excessive, the operation planning unit 204 performs a control to select a distributed power supply 102 capable of storing the excess power such that the selected distributed power supply 102 performs a power storage operation for the excess power.

When it is determined in S302 that "uninterruptible power supply" is not selected as the purpose option, the process proceeds to S306. In S306, the operation planning unit 204 determines whether "securement of remaining energy amount" is selected as the purpose option. The "securement of remaining energy amount" means that a predetermined amount or more of energy is always secured as reserve power, for example, for an emergency. When it is determined in S306 that "securement of remaining energy amount" is selected as the purpose option, the process proceeds to S307.

In S307, the operation planning unit 204 calculates a power demand amount per day from the total power demand amount acquired in S202, and selects distributed power supplies 102 capable of supplying power in the power demand amount. At this time, the distributed power supplies 102 may be selected in a plurality of combinations.

For example, it is assumed that the combinations of the selected distributed power supplies 102 are as follows.

Combination 1: distributed power supplies A+C+D

Combination 2: distributed power supplies A+E

Combination 3: distributed power supplies A+B+F+G

Combination 1 is an example of a combination of distributed power supplies A, C, and D each having a medium power generation amount. Combination 2 is an example of a combination of a distributed power supply A having a medium power generation amount and a distributed power supply E having a large power generation amount. Combination 3 is an example of a combination of a distributed power supply A having a medium power generation amount and distributed power supplies B, F, and G each having a small power generation amount. Here, it is assumed that the distributed power supply E has a larger power storage amount than the distributed power supplies A, B, C, D, F, and G. In addition, it is assumed that the distributed power supplies B, F, and G have smaller power storage amounts than the distributed power supplies A, C, D, and E. The operation planning unit 204 determines priorities of the combinations of the distributed power supplies 102 based on the power storage amounts of the running information. For example, in the above-described example, the priorities are determined in descending order of total power storage amount, such as Combination 2>Combination 1>Combination 3.

Then, the operation planning unit 204 selects the distributed power supplies 102 in the combination having the highest priority. Note that, it is described in the present embodiment that distributed power supplies 102 to be operated are selected in S307, but distributed power supplies 102 permitted to be disconnected from the power supply network 105, that is, not to be operated, may be selected in S308, which is a subsequent step.

In S308, the operation planning unit 204 controls the distributed power supplies 102 to permit disconnection of distributed power supplies 102 other than the distributed power supplies 102 selected in S307 from the power supply network 105.

In S309, based on the running information for the distributed power supplies 102 to be operated, the operation planning unit 204 creates a plan for running the distributed power supplies 102. For example, the operation planning unit 204 schedules start of running, power generation, power storage, and stop of running for the distributed power supply 102 based on the operation time of the running information. After S309, the process of FIG. 7 ends, and the process proceeds to S206 of FIG. 6. When an abnormality of a distributed power supply 102 is detected after the operation is controlled in S206, the processing from S307 is repeated for distributed power supplies 102 in a combination having a next highest priority not including the distributed power supply 102 in which the abnormality has been detected.

When it is determined in S306 that "securement of remaining energy amount" is not selected as the purpose option, the process proceeds to S310. In S310, the operation planning unit 204 determines whether "economic efficiency" is selected as the purpose option. The "economic efficiency" means that the power generation cost is kept low. When it is determined in S310 that "economic efficiency" is selected as the purpose option, the process proceeds to S311.

In S311, the operation planning unit 204 selects distributed power supplies 102 capable of supplying power based on the total power demand amount acquired in S202. At this time, the distributed power supplies 102 may be selected in a plurality of combinations.

For example, it is assumed that the combinations of the selected distributed power supplies 102 are as follows.

Combination 1: distributed power supplies A+C+D

Combination 2: distributed power supplies A+E

Combination 3: distributed power supplies A+B+F+G

Combination 1 is an example of a combination of distributed power supplies A, C, and D each having a medium power generation amount.

Combination 2 is an example of a combination of a distributed power supply A having a medium power generation amount and a distributed power supply E having a large power generation amount. Combination 3 is an example of a combination of a distributed power supply A having a medium power generation amount and distributed power supplies B, F, and G each having a small power generation amount. Here, it is assumed that the distributed power supply E has a higher power generation unit price than the distributed power supplies A, B, C, D, F, and G. In addition, the distributed power supplies B, F, and G have a lower power generation unit price than the distributed power supplies A, C, D, and E. The operation planning unit 204 determines priorities of the combinations of the distributed power supplies 102 based on the power generation unit prices of the running information. For example, in the above-described example, the priorities are determined in descending order of total power generation unit price, such as Combination 3>Combination 1>Combination 2.

Then, the operation planning unit 204 selects the distributed power supplies 102 in the combination having the highest priority. Note that, it is described in the present embodiment that distributed power supplies 102 to be operated are selected in S311, but distributed power supplies 102 permitted to be disconnected from the power supply network 105, that is, not to be operated, may be selected in S312, which is a subsequent step.

In S312, the operation planning unit 204 controls the distributed power supplies 102 to permit disconnection of distributed power supplies 102 other than the distributed power supplies 102 selected in S311 from the power supply network 105.

In S313, based on the running information for the distributed power supplies 102 to be operated, the operation planning unit 204 creates a plan for running the distributed power supplies 102. For example, the operation planning unit 204 schedules start of running, power generation, power storage, and stop of running for the distributed power supply 102 based on the operation time of the running information. After S313, the process of FIG. 7 ends, and the process proceeds to S206 of FIG. 6. When an abnormality of a distributed power supply 102 is detected after the operation is controlled in S206, the processing from S311 is repeated for distributed power supplies 102 in a combination having a next highest priority not including the distributed power supply 102 in which the abnormality has been detected.

When it is determined in S310 that "economic efficiency" is not selected as the purpose option, the process proceeds to S401 of FIG. 8. In S401, the operation planning unit 204 determines whether "environmental friendliness" is selected as the purpose option. The "environmental friendliness" means that exhaust gas is suppressed. When it is determined in S401 that "environmental friendliness" is selected as the purpose option, the process proceeds to S402.

In S402, the operation planning unit 204 selects distributed power supplies 102 capable of supplying power based on the total power demand amount acquired in S202. At this time, the distributed power supplies 102 may be selected in a plurality of combinations.

For example, it is assumed that the combinations of the selected distributed power supplies 102 are as follows.

Combination 1: distributed power supplies A+C+D

Combination 2: distributed power supplies A+E

Combination 3: distributed power supplies A+B+F+G

Combination 1 is an example of a combination of distributed power supplies A, C, and D each having a medium power generation amount. Combination 2 is an example of a combination of a distributed power supply A having a medium power generation amount and a distributed power supply E having a large power generation amount. Combination 3 is an example of a combination of a distributed power supply A having a medium power generation amount and distributed power supplies B, F, and G each having a small power generation amount. Here, it is assumed that the distributed power supply E has a larger gas emission amount than the distributed power supplies A, B, C, D, F, and G. In addition, it is assumed that the distributed power supplies B, F, and G have smaller gas emission amounts than the distributed power supplies A, C, D, and E. The operation planning unit 204 determines priorities of the combinations of the distributed power supplies 102 based on the gas emission amounts of the running information. For example, in the above-described example, the priorities are determined in ascending order of total gas emission amount, such as Combination 3>Combination 1>Combination 2.

Then, the operation planning unit 204 selects the distributed power supplies 102 in the combination having the highest priority. Note that, it is described in the present embodiment that distributed power supplies 102 to be operated are selected in S402, but distributed power supplies 102 permitted to be disconnected from the power supply network 105, that is, not to be operated, may be selected in S403, which is a subsequent step.

In S403, the operation planning unit 204 controls the distributed power supplies 102 to permit disconnection of distributed power supplies 102 other than the distributed power supplies 102 selected in S402 from the power supply network 105.

In S404, based on the running information for the distributed power supplies 102 to be operated, the operation planning unit 204 creates a plan for running the distributed power supplies 102. For example, the operation planning unit 204 schedules start of running, power generation, power storage, and stop of running for the distributed power supply 102 based on the operation time of the running information. After S404, the process of FIG. 8 ends, and the process proceeds to S206 of FIG. 6. When an abnormality of a distributed power supply 102 is detected after the operation is controlled in S206, the processing from S402 is repeated for distributed power supplies 102 in a combination having a next highest priority not including the distributed power supply 102 in which the abnormality has been detected.

When it is determined in S401 that "environmental friendliness" is not selected as the purpose option, the process proceeds to S405 of FIG. 8. In S405, the operation planning unit 204 determines whether "low noise" is selected as the purpose option. The "low noise" means that generated noise is small. When it is determined in S405 that "low noise" is selected as the purpose option, the process proceeds to S406.

In S406, the operation planning unit 204 calculates a power demand amount per day from the total power demand amount acquired in S202, and selects distributed power supplies 102 capable of supplying power in the power demand amount. At this time, the distributed power supplies 102 may be selected in a plurality of combinations.

For example, it is assumed that the combinations of the selected distributed power supplies 102 are as follows.

Combination 1: distributed power supplies A+C+D

Combination 2: distributed power supplies A+E

Combination 3: distributed power supplies A+B+F+G

Combination 1 is an example of a combination of distributed power supplies A, C, and D each having a medium power generation amount. Combination 2 is an example of a combination of a distributed power supply A having a medium power generation amount and a distributed power supply E having a large power generation amount. Combination 3 is an example of a combination of a distributed power supply A having a medium power generation amount and distributed power supplies B, F, and G each having a small power generation amount. Here, it is assumed that the distributed power supply E has a larger noise generation amount than the distributed power supplies A, B, C, D, F, and G. In addition, it is assumed that the distributed power supplies B, F, and G have smaller noise generation amounts than the distributed power supplies A, C, D, and E. The operation planning unit 204 determines priorities of the combinations of the distributed power supplies 102 based on the noise generation amounts of the running information. For example, in the above-described example, the priorities are determined in ascending order of total noise generation amount, such as Combination 3>Combination 1>Combination 2.

Then, the operation planning unit 204 selects the distributed power supplies 102 in the combination having the highest priority. Note that, it is described in the present embodiment that distributed power supplies 102 to be operated are selected in S406, but distributed power supplies 102 permitted to be disconnected from the power supply network 105, that is, not to be operated, may be selected in S407, which is a subsequent step.

In S407, the operation planning unit 204 controls the distributed power supplies 102 to permit disconnection of distributed power supplies 102 other than the distributed power supplies 102 selected in S406 from the power supply network 105.

In S408, based on the running information for the distributed power supplies 102 to be operated, the operation planning unit 204 creates a plan for running the distributed power supplies 102. For example, the operation planning unit 204 schedules start of running, power generation, power storage, and stop of running for the distributed power supply 102 based on the operation time of the running information. After S408, the process of FIG. 8 ends, and the process proceeds to S206 of FIG. 6. When an abnormality of a distributed power supply 102 is detected after the operation is controlled in S206, the processing from S406 is repeated for distributed power supplies 102 in a combination having a next highest priority not including the distributed power supply 102 in which the abnormality has been detected.

When it is determined in S405 that "low noise" is not selected as the purpose option, the processes of FIGS. 8 and 6 end, and the operation is not started. Note that, when it is determined in S405 that "low noise" has not been selected as the purpose option, a process may be performed for another purpose option. For example, data regarding an odor may be stored in the performance information of the database of FIG. 9B, and a process similar to the above-described process may be performed for "suppression of odor".

As described with reference to FIGS. 7 and 8, the distributed power supplies 102 to be selected may vary depending on the information on the purpose of the power supply control. In other words, the information on the purpose of the power supply control is used as a selection criterion for selecting distributed power supplies 102 to be operated. As described above, according to the present embodiment, it is possible to flexibly select and operate each distributed power supply existing in an area to be managed based on the information on the purpose of the power supply control, the performance information and the running information for the distributed power supplies 102, and the total power demand amount of the demanders 104. Further, although it has been described in the present embodiment that an input of predetermined purpose information is received from the administrator, purpose information and a parameter (the power storage amount, the power generation unit price, or the like described above) used as a criterion for determining priorities of combinations may be arbitrarily set. At that time, a plurality of parameters may be set for one option of purpose information, or weighting may be performed for each of the plurality of parameters.

SUMMARY OF EMBODIMENT

A control device of the above-described embodiment is a control device (101) capable of communicating with a plurality of distributed power supplies (102) in a power supply system (100) that supplies power to a demander (104), the control device including: a first acquisition unit (S111) configured to acquire information regarding performance and running from each of the plurality of distributed power supplies; a second acquisition unit (S101, S102) configured to acquire a power demand amount from a plurality of demanders to which power is to be supplied by the plurality of distributed power supplies; a third acquisition unit (S201) configured to acquire a selection criterion to be used at a time of selecting, from among the plurality of distributed power supplies, a distributed power supply to be operated when supplying power to the plurality of demanders; a selection unit (S307, S311, S402, S406) configured to select a distributed power supply to be operated from among the plurality of distributed power supplies based on the information acquired by the first acquisition unit, the power demand amount acquired by the second acquisition unit, and the selection criterion acquired by the third acquisition unit; a creation unit (S309, S313, S404, S408) configured to create an operation plan for the distributed power supply selected by the selection unit; and a control unit (S206) configured to control running of the distributed power supply selected by the selection unit based on the operation plan created by the creation unit.

With such a configuration, it is possible to flexibly select and operate each distributed power supply existing in an area to be managed based on the information on the purpose of the power supply control, the performance information and the running information for the distributed power supplies, and the total power demand amount of the demanders.

The control device further includes a storage unit configured to store a first database in which the information acquired by the first acquisition unit and each of the plurality of distributed power supplies are associated with each other, and a second database in which the power demand amount acquired by the second acquisition unit and each of the plurality of demanders are associated with each other (203, FIGS. 9A and 9B). The first acquisition unit acquires the information at predetermined time intervals, and updates the first database with the acquired information. The second acquisition unit acquires the power demand amount at predetermined time intervals, and updates the second database with the acquired information.

With such a configuration, it is possible to constantly store information regarding performance and running and power demand amounts in the databases.

The selection unit acquires a combination of distributed power supplies operable with respect to the power demand amount acquired by the second acquisition unit based on the information acquired by the first acquisition unit, and in a case where a plurality of combinations are acquired, the selection unit determines priorities of the plurality of combinations based on the selection criterion acquired by the third acquisition unit, and selects distributed power supplies included in a combination having the highest priority.

With such a configuration, it is possible to determine priorities that vary depending on the selection criterion to select distributed power supplies.

The selection criterion is a criterion acquired for a purpose of at least one of securement of remaining energy amount, economic efficiency, environmental friendliness, and low noise. When the selection criterion is acquired by the third acquisition unit for the purpose of securement of remaining energy amount, the selection unit selects the distributed power supplies included in the combination having the highest priority determined based on power storage amounts included in the information acquired by the first acquisition unit. When the selection criterion is acquired by the third acquisition unit for the purpose of economic efficiency, the selection unit selects the distributed power supplies included in the combination having the highest priority determined based on power generation unit prices included in the information acquired by the first acquisition unit. When the selection criterion is acquired by the third acquisition unit for the purpose of environmental friendliness, the selection unit selects the distributed power supplies included in the combination having the highest priority determined based on gas emission amounts included in the information acquired by the first acquisition unit. When the selection criterion is acquired by the third acquisition unit for the purpose of low noise, the selection unit selects the distributed power supplies included in the combination having the highest priority determined based on noise generation amounts included in the information acquired by the first acquisition unit.

With such a configuration, for example, it is possible to determine priorities using each of the securement of remaining energy amount, the economic efficiency, the environmental friendliness, and the low noise as a selection criterion to select distributed power supplies.

The third acquisition unit acquires the selection criterion based on an input by a user through a user interface screen.

With such a configuration, for example, an administrator of the power supply system 100 can input a selection criterion.

The power demand amount is a power demand amount obtained by adding up the power demand amounts of the plurality of demanders.

With such a configuration, it is possible to select distributed power supplies 102 to be operated based on the total power demand amount of the demanders 104 existing in the power supply system 100.

The distributed power supplies include at least one of a diesel engine-based power generation device, a sunlight-based power generation device, a wind-based power generation device, and a fuel cell-based power generation device.

With such a configuration, distributed power supplies in various power generation types can be used.

The power supply system is a system that is not supplied with power from a bulk power system.

With such a configuration, the operation according to the present embodiment can be applied to the power supply system 100 constructed in an off-grid area.

The invention is not limited to the foregoing embodiments, and various variations/changes are possible within the spirit of the invention.

What is claimed is:

1. A control device capable of communicating with a plurality of distributed power supplies in a power supply system that supplies power to a plurality of demanders, the control device comprising:

a first acquisition unit configured to acquire information regarding performance and running from each of the plurality of distributed power supplies;

a second acquisition unit configured to acquire a power demand amount from the plurality of demanders to which power is to be supplied by the plurality of distributed power supplies;

a third acquisition unit configured to acquire a selection criterion for power supply control to be used at a time of selecting, from among the plurality of distributed power supplies, a distributed power supply to be operated when supplying power to the plurality of demanders;

a selection unit configured to select a distributed power supply to be operated from among the plurality of distributed power supplies based on the information acquired by the first acquisition unit, the power demand amount acquired by the second acquisition unit, and the selection criterion for power supply control acquired by the third acquisition unit;

a creation unit configured to create an operation plan for the distributed power supply selected by the selection unit; and a control unit configured to control running of the distributed power supply selected by the selection unit based on the operation plan created by the creation unit, wherein the selection unit acquires one or more combinations of distributed power supplies operable with respect to the power demand amount acquired by the second acquisition unit based on the information acquired by the first acquisition unit, and in a case where the one or more combinations corresponds to a plurality of combinations and the plurality of combinations are acquired, the selection unit determines priorities of the plurality of combinations based on the selection criterion for power supply control acquired by the third acquisition unit, and selects distributed power supplies included in a combination having the highest priority.

2. The control device according to claim 1, further comprising a storage unit configured to store a first database in which the information acquired by the first acquisition unit and each of the plurality of distributed power supplies are associated with each other, and a second database in which the power demand amount acquired by the second acquisition unit and each of the plurality of demanders are associated with each other.

3. The control device according to claim 2, wherein the first acquisition unit acquires the information at predetermined time intervals, and updates the first database with the information acquired.

4. The control device according to claim 2, wherein the second acquisition unit acquires the power demand amount at predetermined time intervals, and updates the second database with the power demand amount acquired.

5. The control device according to claim 1, wherein the selection criterion for power supply control is a criterion acquired for a purpose of at least one of securement of remaining energy amount, economic efficiency, environmental friendliness, and low noise.

6. The control device according to claim 5, wherein when the selection criterion for power supply control is acquired by the third acquisition unit for the purpose of the securement of remaining energy amount, the selection unit selects the distributed power supplies included in the combination having the highest priority determined based on power storage amounts included in the information acquired by the first acquisition unit.

7. The control device according to claim 5, wherein when the selection criterion for power supply control is acquired by the third acquisition unit for the purpose of the economic efficiency, the selection unit selects the distributed power supplies included in the combination having the highest priority determined based on power generation unit prices included in the information acquired by the first acquisition unit.

8. The control device according to claim 5, wherein when the selection criterion for power supply control is acquired by the third acquisition unit for the purpose of the environmental friendliness, the selection unit selects the distributed power supplies included in the combination having the highest priority determined based on gas emission amounts included in the information acquired by the first acquisition unit.

9. The control device according to claim 5, wherein when the selection criterion for power supply control is acquired by the third acquisition unit for the purpose of the low noise, the selection unit selects the distributed power supplies included in the combination having the highest priority determined based on noise generation amounts included in the information acquired by the first acquisition unit.

10. The control device according to claim 1, wherein the third acquisition unit acquires the selection criterion for power supply control based on an input by a user through a user interface screen.

11. The control device according to claim 1, wherein the power demand amount is a power demand amount obtained by adding up the power demand amounts of the plurality of demanders.

12. The control device according to claim 1, wherein the distributed power supplies include at least one of a diesel engine-based power generation device, a sunlight-based power generation device, a wind-based power generation device, or a fuel cell-based power generation device.

13. The control device according to claim 1, wherein the power supply system is a system that is not supplied with power from a bulk power system.

14. The control device according to claim 1, wherein, when an abnormality of a distributed power supply included in the combination is detected after control of the running, the selection unit repeats the selection for a combination having a next highest priority and not including the distributed power supply in which the abnormality has been detected.

15. The control device according to claim 1, wherein the creation unit, as creation of the operation plan, schedules at least one of start of running, power generation, power storage, or stop of running for the distributed power supply selected by the selection unit.

16. A control method executed in a control device capable of communicating with a plurality of distributed power supplies in a power supply system that supplies power to a plurality of demanders, the control method comprising:

acquiring information regarding performance and running from each of the plurality of distributed power supplies;

acquiring a power demand amount from the plurality of demanders to which power is to be supplied by the plurality of distributed power supplies;

acquiring a selection criterion for power supply control to be used at a time of selecting, from among the plurality of distributed power supplies, a distributed power supply to be operated when supplying power to the plurality of demanders;

selecting a distributed power supply to be operated from among the plurality of distributed power supplies based on the acquired information, the acquired power demand amount, and the acquired selection criterion for power supply control;

creating an operation plan for the selected distributed power supply; and controlling running of the distributed power supply selected based on the created operation plan, wherein one or more combinations of distributed power supplies operable with respect to the acquired power demand amount is acquired based on the acquired information, and in a case where the one or more combinations corresponds to a plurality of combinations and the plurality of combinations are acquired, priorities of the plurality of combinations are determined based on the acquired selection criterion, and distributed power supplies included in a combination having the highest priority are selected.

17. A non-transitory computer-readable storage medium storing a program for causing a computer of a control device capable of communicating with a plurality of distributed power supplies in a power supply system that supplies power to a plurality of demanders to function to:

acquire information regarding performance and running from each of the plurality of distributed power supplies;

acquire a power demand amount from the plurality of demanders to which power is to be supplied by the plurality of distributed power supplies;

acquire a selection criterion for power supply control to be used at a time of selecting, from among the plurality of distributed power supplies, a distributed power supply to be operated when supplying power to the plurality of demanders;

select a distributed power supply to be operated from among the plurality of distributed power supplies based on the acquired information, the acquired power demand amount, and the acquired selection criterion for power supply control;

create an operation plan for the selected distributed power supply; and control running of the distributed power supply selected based on the created operation plan, wherein one or more combinations of distributed power supplies operable with respect to the acquired power demand amount is acquired based on the acquired information, and in a case where the one or more combinations corresponds to a plurality of combinations and the plurality of combinations are acquired, priorities of the plurality of combinations are determined based on the acquired selection criterion for power supply control, and distributed power supplies included in a combination having the highest priority are selected.

18. The control device according to claim 1, wherein a plurality of parameters are set for one option of the selection criterion for power supply control and weighting is performed for each of the plurality of parameters when determining the priorities of the plurality of combinations.

* * * * *